US010089000B2

(12) United States Patent
Ott et al.

(10) Patent No.: US 10,089,000 B2
(45) Date of Patent: Oct. 2, 2018

(54) AUTO TARGETING ASSISTANCE FOR INPUT DEVICES

(71) Applicant: Microsoft Technology Licensing, LLC, Redmond, WA (US)

(72) Inventors: Michael James Ott, Bellevue, WA (US); Jared Greiner, Seattle, WA (US); Michael David McGrath, Monroe, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/359,516

(22) Filed: Nov. 22, 2016

(65) Prior Publication Data

US 2017/0351393 A1 Dec. 7, 2017

Related U.S. Application Data

(60) Provisional application No. 62/345,573, filed on Jun. 3, 2016.

(51) Int. Cl.
*G06F 3/00* (2006.01)
*G06F 3/0485* (2013.01)
*G06F 3/0484* (2013.01)
*G06F 3/0481* (2013.01)

(52) U.S. Cl.
CPC ........ *G06F 3/0485* (2013.01); *G06F 3/04817* (2013.01); *G06F 3/04842* (2013.01)

(58) Field of Classification Search
CPC ................................................... G06F 3/04812
See application file for complete search history.

(56) References Cited

U.S. PATENT DOCUMENTS

| 8,174,504 B2 | 5/2012 | Arthur et al. |
| 9,280,327 B2 | 3/2016 | Banerjee |
| 2013/0191788 A1 | 7/2013 | Walker et al. |
| 2013/0241805 A1 | 9/2013 | Gomez |
| 2013/0305193 A1 | 11/2013 | Kelley et al. |

(Continued)

OTHER PUBLICATIONS

Rietbergen, Guus, "Alternative input devices: Using the DJ deck to control GUI elements", Retrieved on: Jun. 7, 2016 Available at: http://dare.uva.nl/cgi/arno/show.cgi?fid=550333.

(Continued)

*Primary Examiner* — Haoshian Shih
(74) *Attorney, Agent, or Firm* — Scott Y. Shigeta; Newport IP, LLC (57) ABSTRACT

Techniques described herein enable auto targeting assistance for input devices. Among a number of aspects of the present disclosure, techniques disclosed herein enable a computing device to receive a directional input signal from a wide range of input devices to select an interface element from a number of interface elements based on an arrangement of the interface elements. In some configurations, one or more angles and distances can be measured from an interface element to a vector derived from an input signal. The angles and distances can be used to select the interface element based on one or more criteria, including a weighted set of angles and distances. Auto scrolling functions can also bring a hidden interface element into a viewing area. The techniques disclosed herein can provide such functionality without requiring a UI programmer to provide complex code that associates individual interface elements for navigational purposes.

20 Claims, 10 Drawing Sheets

(56) References Cited

U.S. PATENT DOCUMENTS

| | | |
|---|---|---|
| 2014/0282278 A1 | 9/2014 | Anderson et al. |
| 2014/0380230 A1 | 12/2014 | Venable et al. |
| 2015/0003819 A1 | 1/2015 | Ackerman et al. |
| 2015/0077323 A1 | 3/2015 | Ramaswamy et al. |
| 2015/0097691 A1 | 4/2015 | Smith |
| 2015/0169171 A1 | 6/2015 | Fotland |
| 2015/0346920 A1 | 12/2015 | Hoa |

OTHER PUBLICATIONS

Carter, et al., "Dynamically Adapting GUIs to Diverse Input Devices", In Proceedings of the 8th international ACM SIGACCESS conference on Computers and accessibility, Oct. 22, 2006, 8 pages.

AUTO TARGETING ASSISTANCE FOR INPUT DEVICES

CROSS REFERENCE TO RELATED APPLICATION

This patent application claims the benefit of U.S. Provisional Patent Application Ser. No. 62/345,573 filed Jun. 3, 2016, entitled "AUTO TARGETING ASSISTANCE FOR INPUT DEVICES," which is hereby incorporated in its entirety by reference.

BACKGROUND

There is an increasing number of input devices on the market. For example, computers can receive input signals from mice, keyboards, touch pads, analog joysticks, directional pads, cameras, wands, head-mounted displays (HMDs), and eye tracking devices, to name a few. When it comes to designing and coding graphical user interfaces, some current programming paradigms do not optimally provide a universal approach to accommodating a wide range of input devices. In fact, some current programming paradigms can make it difficult for developers to write code for user interfaces that can be used with a wide range of input devices. For instance, a computer programmer that is skilled in designing user interfaces for touch input devices may require extensive training to design and code a user interface for a head tracking input device. In addition, some coding paradigms require programmers to write code to associate individual interface elements with one another to allow users to navigate between the individual interface elements. Such coding requirements can be cumbersome, particularly when a developer is working with a large number of interface elements.

Figure 1A:
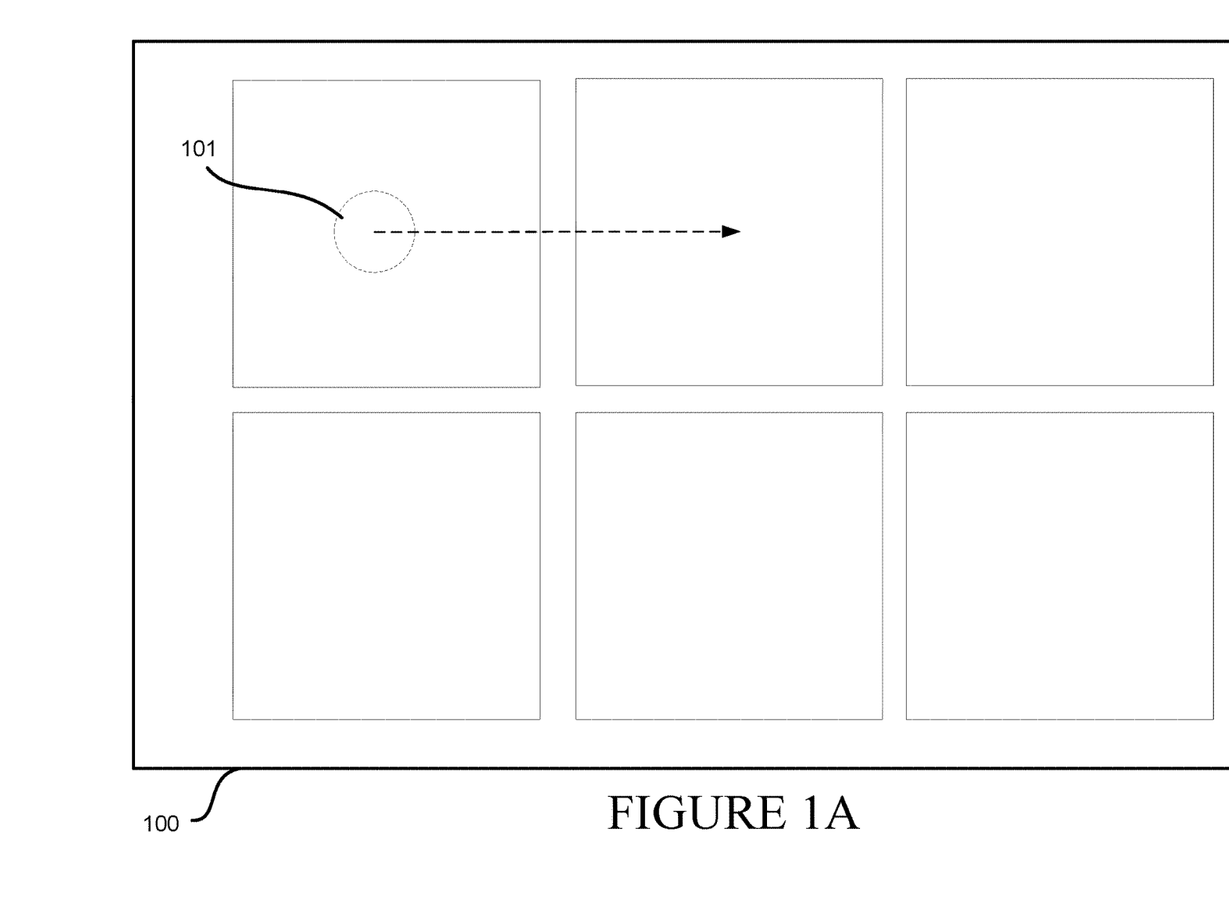
FIGS. 1A and 1B illustrate a user interface having a number of selectable interface elements, each of which may be selectable buttons associated with some type of computerized functionality.
Figure 1B:
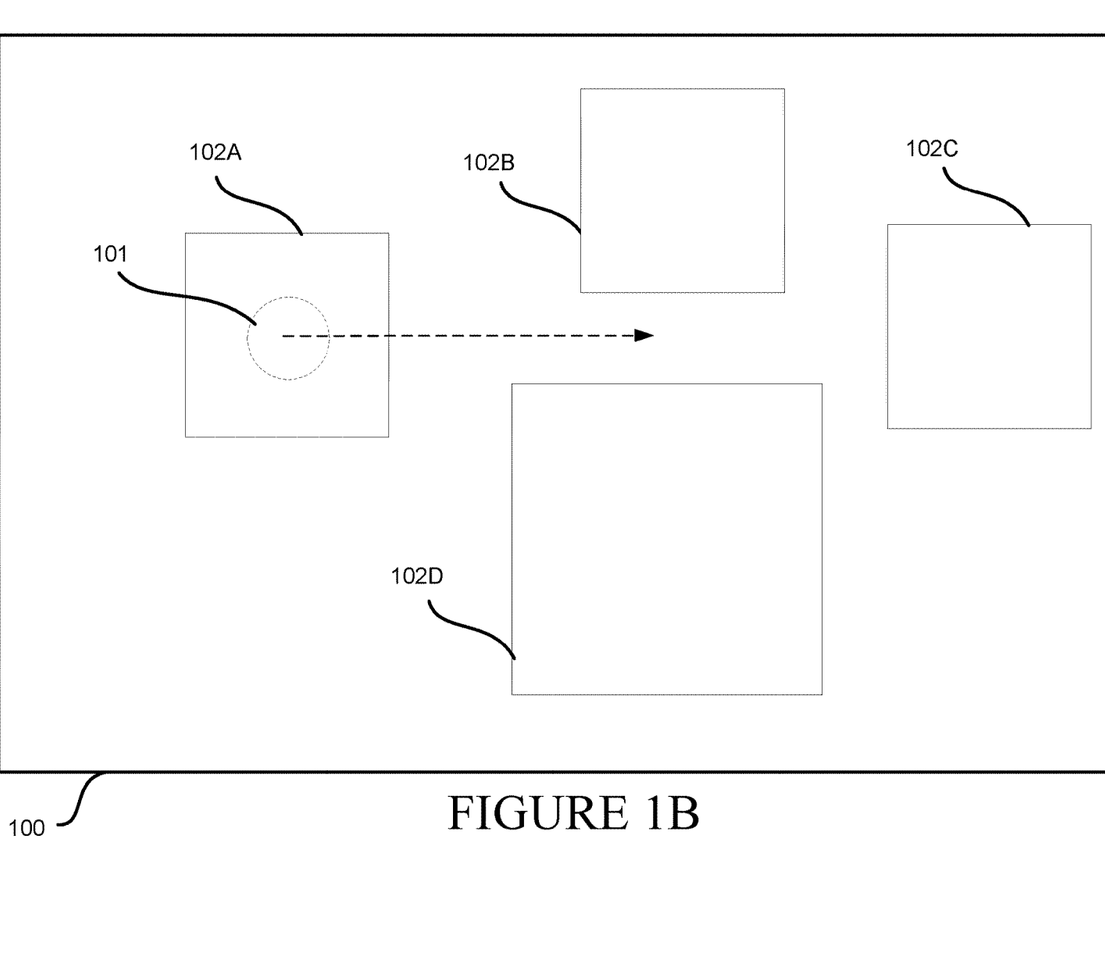

In addition to the above-described issue, in some cases, when a particular programming methodology is used to implement a user interface that accommodates certain input technologies, some existing programming methodologies can restrict the number of UI layout options. FIGS. 1A and 1B illustrate one example of such a dilemma.

FIG. 1A illustrates a user interface 100 having a number of selectable interface elements, each of which may be selectable buttons associated with some type of computerized functionality. Such a layout is useful for most types of input devices, such as a directional pad (a four-direction D-pad), a keyboard, etc. When a user wants to move a focus point 101, e.g., a selected section of the UI, from one interface element to another, they can actuate a button indicating a direction, as shown.

Although some devices can work with certain UI layouts having a degree of uniformity, such as the one shown in FIG. 1A, some devices may not work so well when the UI layout is not uniform, such as the UI layout shown in FIG. 1B. In this example, when buttons, icons, and other graphical elements are different sizes and not aligned with one another, it may be difficult for some users having certain types of input devices to select a desired interface element.

In the example shown in FIG. 1B, when the user wants to move a focus point 101 from the first interface element 102A to another interface element, some input devices providing a direction may not provide a sufficient level of accuracy for an operating system to determine if the user is pointing at the second interface element 102B, the third interface element 102C, or the fourth interface element 102D. This issue is exacerbated as the industry produces new types of input devices, each providing a different level of accuracy. Thus, most UI designers cannot even contemplate such unique, non-uniform UI designs because the code for such UI designs would have to accommodate each type of input device and/or different levels of accuracy to enable users to proficiently navigate to desired interface elements.

It is with respect to these and other considerations that the disclosure made herein is presented.

SUMMARY

Techniques described herein enable auto targeting assistance for input devices. Among a number of aspects of the present disclosure, techniques disclosed herein enable a computing device to receive a directional input signal from a wide range of input devices to select an interface element from a number of interface elements based on an arrangement of the interface elements. The techniques disclosed herein also provide an automatic scrolling feature that scrolls to hidden user interface elements, e.g., selectable icons. The techniques disclosed herein can provide such functionality without requiring a UI programmer to provide complex code that associates individual interface elements for navigational purposes. More specifically, the techniques disclosed herein enable users to select interface elements without requiring each interface element to be associated with code for a particular input device having a particular level of accuracy or code that defines a particular navigation order.

By the use of a targeting model that generates a directional vector from an input signal of an input device, instead of relying on code that provides a navigation order between the interface elements, interface elements can be selected based on a comparison of angles and distances of the directional vector relative to positions of the interface elements. Weighting factors can also be applied to the angles and distances used for selecting the interface elements. The use of the vector and the weighting factors enables systems to predict interface elements that are targeted by a user. As will be described in more detail below, the use of the vector, and in some embodiments, the use of the weighting factors, enable computer operators to navigate to desired interface elements using a wide range of input devices having varying degrees of accuracy.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Techniques described herein enable auto targeting assistance for input devices. Among a number of aspects of the present disclosure, techniques disclosed herein enable a computing device to receive a directional input signal from a wide range of input devices to select an interface element from a number of interface elements based on an arrangement of the interface elements. The techniques disclosed herein can provide such functionality without requiring a UI programmer to provide complex code that associates individual interface elements for navigational purposes. More specifically, the techniques disclosed herein enable users to select interface elements without requiring each interface element to be associated with code for particular input devices or code that defines a particular navigation order. In addition, the techniques disclosed herein enable computer operators to use a wide range of input devices having different levels of accuracy.

Figure 2:
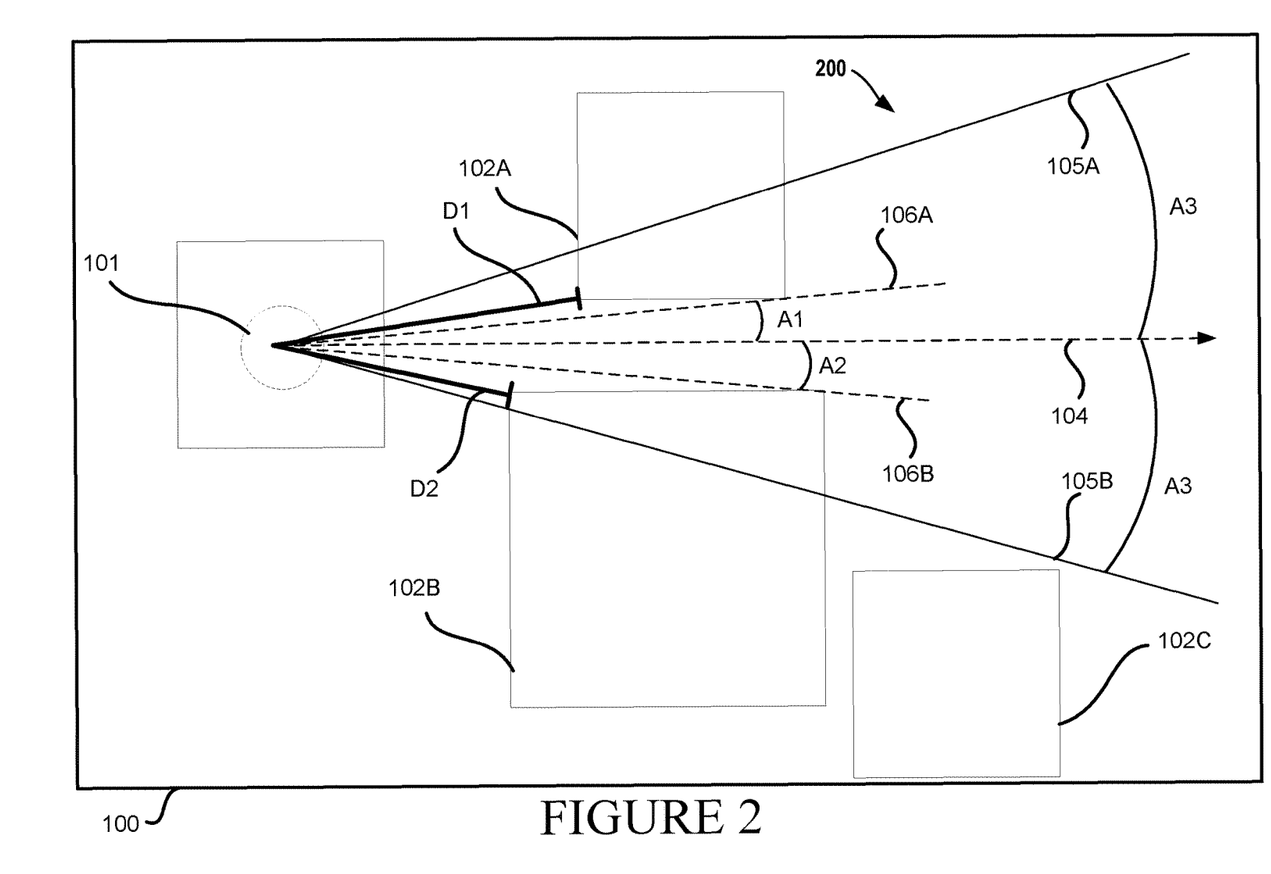
FIG. 2 illustrate a user interface having a number of selectable interface elements that can be used to define one or more angles and distances from a focus point.

One illustrative example is shown in FIG. 2. In this example, a method can include receiving an input signal from an input device, such as, but not limited to, a pointing device, a touch pad, a mouse, a keyboard, a keyboard, a directional pad, a camera, a wand, a head-mounted display (HMDs), pressure sensitive surfaces, an eye tracking device, or an analog joystick. Based on a direction defined in the input signal, a computing device can generate data defining a frustum 200 comprising a vector 104 projecting from a focus point 101 of a user interface 100, where the vector 104 projects in a direction indicated by the input signal. In some configurations, the frustum 200 comprises at least two sides 105, where each side (105A and 105B) can be on opposite sides of the vector 104 at a predetermined angle (A3) from the vector 104.

The computing device can then determine when at least a portion of an interface element is within the sides 105 of the frustum 200. In this example, given the layout of the elements, the computing device determines that the first interface element 102A and the second interface element 102B are within the sides 105 of the frustum 200. In addition, the computing device determines that the third interface element 102C is not within the sides 105 of the frustum 200. For illustrative purposes, an interface element 102 is also referred to herein as a "user interface element 102."

In some configurations, measurements can be taken for one or more user elements 102 that are within the frustum 200. For example, the computing device can determine a first distance (D1) between the focus point 101 and the first interface element 102A, a first angle (A1) between the vector 104 and a first vector 106A between the focus point 101 and the first interface element 102A, a second distance (D2) between the focus point 101 and the second interface element 102B, and a second angle (A2) between the vector 104 and a second vector 106B between the focus point 101 and the second interface element 102B. The computing device can then select the first interface element 102A or the second interface element 102B based, at least in part, on the first distance (D1), the second distance (D2), the first angle (A1), and/or the second angle (A2).

In some configurations, each angle can be can be compared against one another and/or each distance can be compared against one another. In some configurations, the interface element having the lowest angle and the shortest distance is selected. In some configurations, the interface element having the lowest angle or the shortest distance is selected.

Among a number of other examples, the first user interface element 102A can be selected when the first angle is less than the second angle. In addition, the second user interface element 102B can be selected when the second angle is less than the first angle. In some configurations, the first user interface element 102A can be selected when the first distance is less than the second distance. Yet, in another example, the second user interface element 102B can be selected when the second distance is less than the first distance.

In some configurations, combinations of various criteria can be utilized. For example, the first user interface element can be selected when the first distance is less than the second distance and when the first angle is less than the second angle. Similarly, in another example, the second user interface element can be selected when the second distance is less than the first distance and when the second angle is less than the first angle.

In some configurations, the analysis of the user interface elements 102 can be performed without the use of a frustum 200. One example of such configurations shown in FIG. 3. In this example, upon receiving an input signal from an input device, a computing device can generate data defining a vector originating from a focus point 101 of a user interface 100, where the vector 104 is projecting in a direction indicated by the input signal. The computer can then determine a distance (D1) between the focus point 101 and a first user interface element 102A and an angle (A1) between the vector 104 and a second vector 106A between the focus point 101 and the first user interface element 102A. The computer can then select the first user interface element 102A based, at least in part, on the distance and the angle. The selection of the first user interface element 102A can be based on the angle (A1) meeting or exceeding a first threshold and/or the distance (D1) meeting or exceeding a second threshold. The thresholds can be based on other received values, such as the second angle (A2) and the second distance (D2), or other values, which may include weighted values, parameters defined by an application or operating system, etc. Although this example method utilizing thresholds is used to illustrate configurations that do not involve a frustum, it can be appreciated that a frustum can be part of such configurations.

For illustrative purposes, a focus point 101 can be a selected user interface element, a specific area of a user interface, or any other area of a user interface 100 that can serve as a point of origination of a directional vector 104. The focus point 101 can be defined by coordinate system which can be two-dimensional or three-dimensional.

For illustrative purposes, a frustum can be a two-dimensional or three-dimensional region which models an area from a focus point. In some configurations, as shown in FIG. 2, a frustum can be a triangle having a direction as indicated by the vector 104. The width of a frustum can be determined by one or more angles (A3). The angles can be the same or they can differ depending on one or more factors.

In some configurations, a frustum can be a cone or a pyramid having a height (H) and a diameter (D) or height (H) and width (W) with respect to a focus point. These examples are provided for illustrative purposes and are not to be construed as limiting. It can be appreciated that a frustum can take a number of shapes depending on an operating environment. For instance, in a three-dimensional virtual reality environment the selectable items can be three-dimensional objects and a frustum can be a pyramid projecting from a viewing perspective of a user. The vector of the frustum can extend in a gaze direction of a user, where a gaze direction can be defined by an input signal, e.g., input data, generated by cameras, accelerometers, and other devices for tracking gestures of a user.

The angles (A3) of the frustum 200 can be based on one or more factors. For instance, the angles can be based on contextual data received from an application preference file, a user preference file or any other data source. The angles (A3) of the frustum 200, for instance, can be larger or smaller depending on the requirements of an application or operating system. It can be appreciated that a smaller angle would capture fewer interface elements for analysis and such a configuration may benefit some scenarios. In addition, a larger angle would capture more interface elements for analysis and such a configuration may benefit other scenarios.

In some configurations, one or more weights, also referred to herein as "weighting factor," can be applied to individual angles, e.g., A1 and/or A2, and individual distance values, e.g., D1 and/or D2, to generate data defining weighted angles and weighted distance values, and an interface element can be selected based on the weighted angles and weighted distance values. A weighting factor can also be applied to a threshold that is compared to an angle or a weighting factor can also be applied to a threshold compared to a distance.

In one example, if a first angle (for a first UI element) is 10 degrees and a second angle (for a second UI element) is 8 degrees, a weighting factor of 0.7 can cause the generation of data indicating a first weighted angle of 7 degrees, which can be determined from the first angle of 10 degrees. With the weighted angle, the user interface element associated with first angle may be selected even though the second angle is less than the first angle. Such a feature can give preference to a function that has a higher priority.

A similar weighting can be applied to a distance as well. For example, a first distance can be 10 mm and a second distance can be 12 mm. The second distance of 12 mm can be adjusted to 9 mm by the application of a weighting factor, and a user interface element associated with the second weighted distance can be selected based, at least in part, on a comparison between the second weighting distance and the first distance. A comparison can also be made between a first weighted distance and a second weighted distance.

A weighting factor can be based on any suitable data, including but not limited to preference data, contextual data and other types of data. For instance, if a user is working with an application requiring a certain level of accuracy, contextual data defining such an application can be used to generate data defining a weighting factor. In other examples, contextual data defining one or more preferences of a user, properties of an application, user activity of an application, or any other parameters of an application or an operating system, can be used to generate data defining a weighting factor. The weighting factor can then be applied to an angle or a distance value obtained during an analysis of a user interface element to generate a weighted angle and/or a weighted distance.

By the use of contextual data and preference data, the user's historical interactions with a computer can be used to adjust a weighting factor. Such configurations can enable computer to adjust to a user's patterns and behavior. One or more machine learning technologies can also be applied to further adjust a weighting factor so a computer can intelligently make adjustments to input signals as a user interacts with the computer. In addition, one or more heuristic technologies can be utilized to generate a weighting factor. Such technologies can enable computer to adjust to different contexts and different applications.

Figure 4:
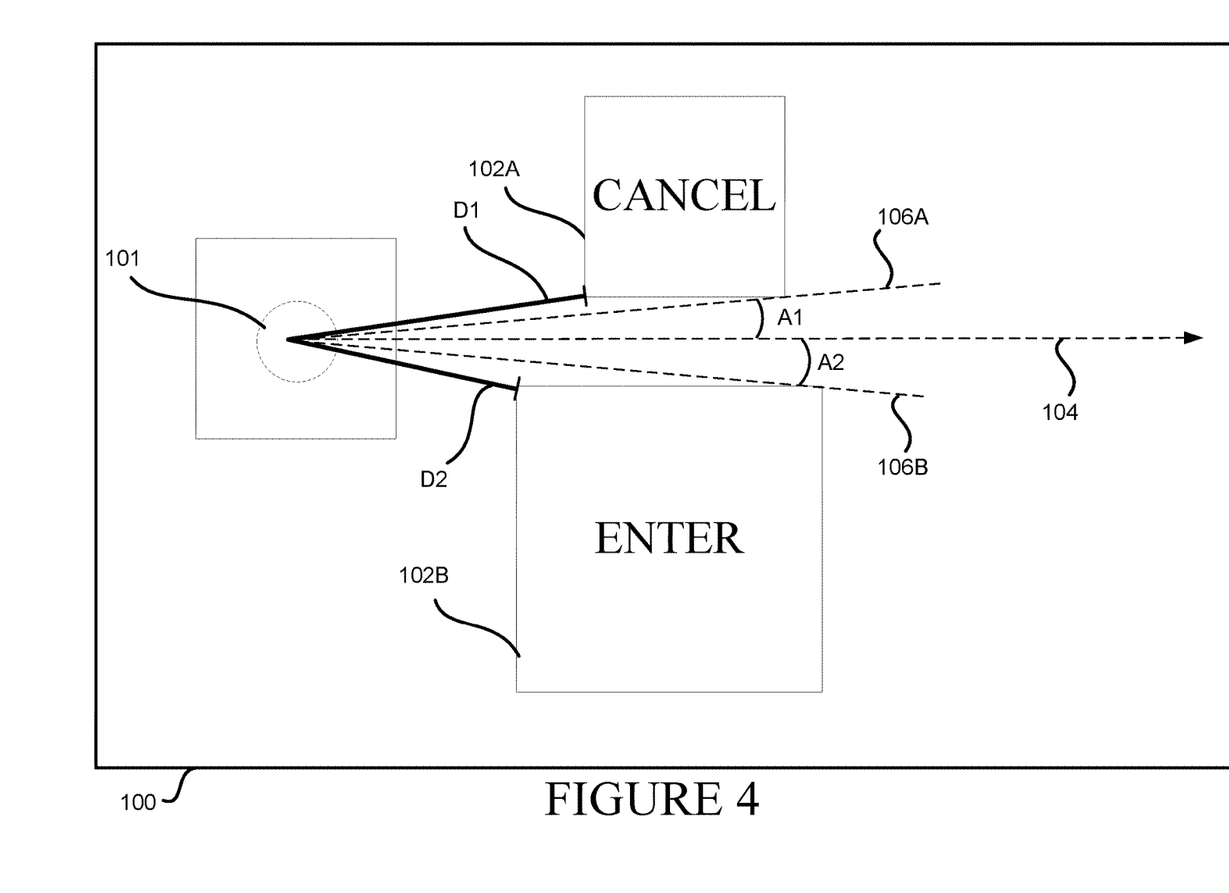
FIG. 4 illustrate a user interface having a number of selectable interface elements that can be selected based on a priority associated with one or more interface elements.

In accordance with some aspects of the present disclosure, a function or a priority of a function associated with an interface element can influence a weighting factor that is applied to an angle or a distance value. Such configurations can be used to influence the selection of a preferred interface element. FIG. 4 illustrates one example of such a configuration. In this example, the first interface element 102A is a "Cancel" button, and the second interface element 102B is an "Enter" button. In such configurations, the "Enter" button may be preferred in over the "Cancel" button, e.g., an "enter" function can have a higher priority than a "cancel" function. In such a scenario, data defining weighting factors consistent with that preference can be applied to the techniques disclosed herein. For example, when the angles (A1 and A2) are within a threshold difference and the distance values (D1 and D2) are within a threshold difference, the computing device may bias a selection towards the "Enter" button by adjusting a weighting factor applied to the angle and/or the distance value of one of the interface elements. In one example, D2 and/or A2 can be weighted higher than D1 and/or A1 to bring a bias toward the "Enter" function over the "cancel" function.

In accordance with some aspects of the present disclosure, a size of an interface element can affect a weighting of an angle or a distance value to influence the selection of a preferred interface element. In the example shown in FIG. 4, data defining the size of each interface element 102 can be received by a computer and one or more weighting factors can be generated based on the size of each element 102. Other aspects of an interface element 102, such as a shape, color, or any other property can be used to influence or more weighting factors. The weighting factor can then be applied to an angle or a distance obtained during an analysis of a user interface element to generate a weighted angle and/or a weighted distance. The weighted angle and/or a weighted distance can then be utilized to select at least one interface element 102.

Figure 3:
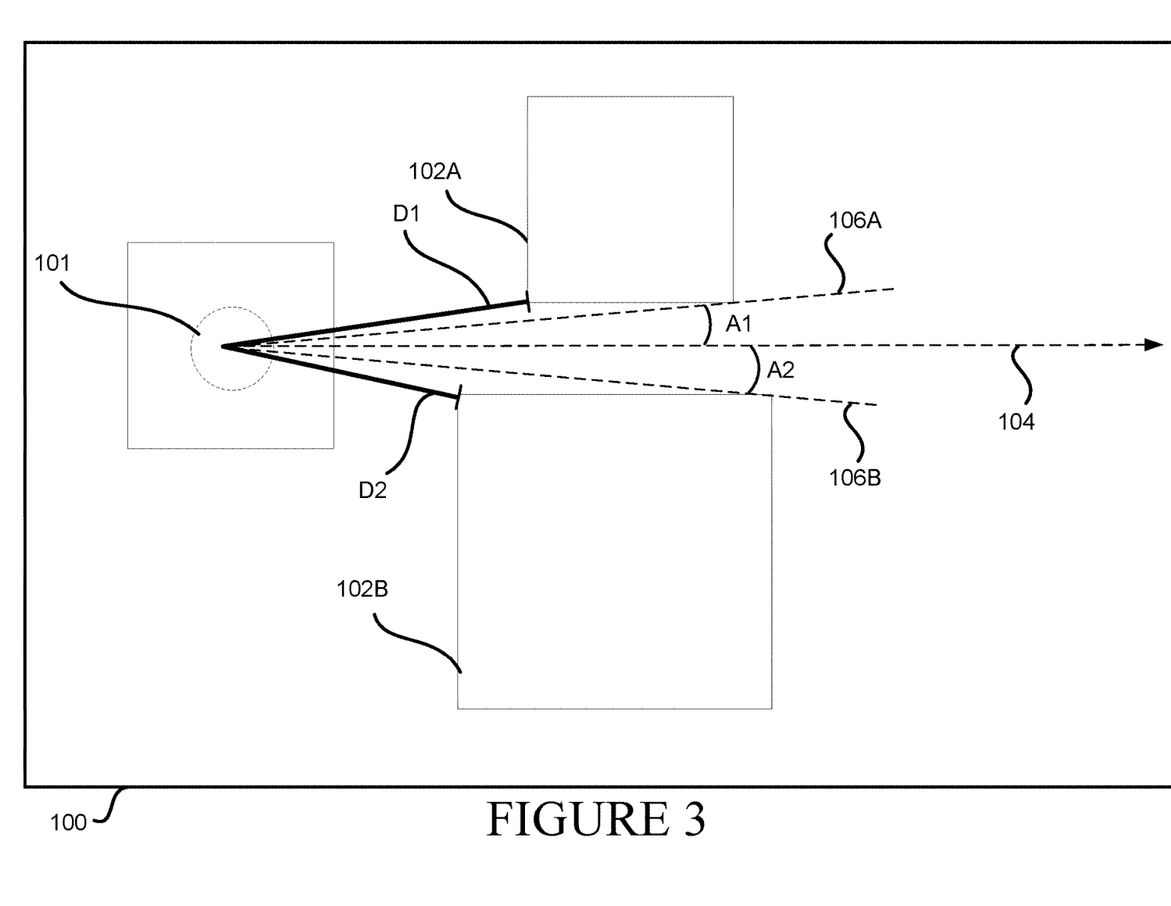
FIG. 3 illustrate a user interface having a number of selectable interface elements that can be used to define one or more angles and distances from a focus point, wherein the angles are based on a border of an interface element.
Figure 5:
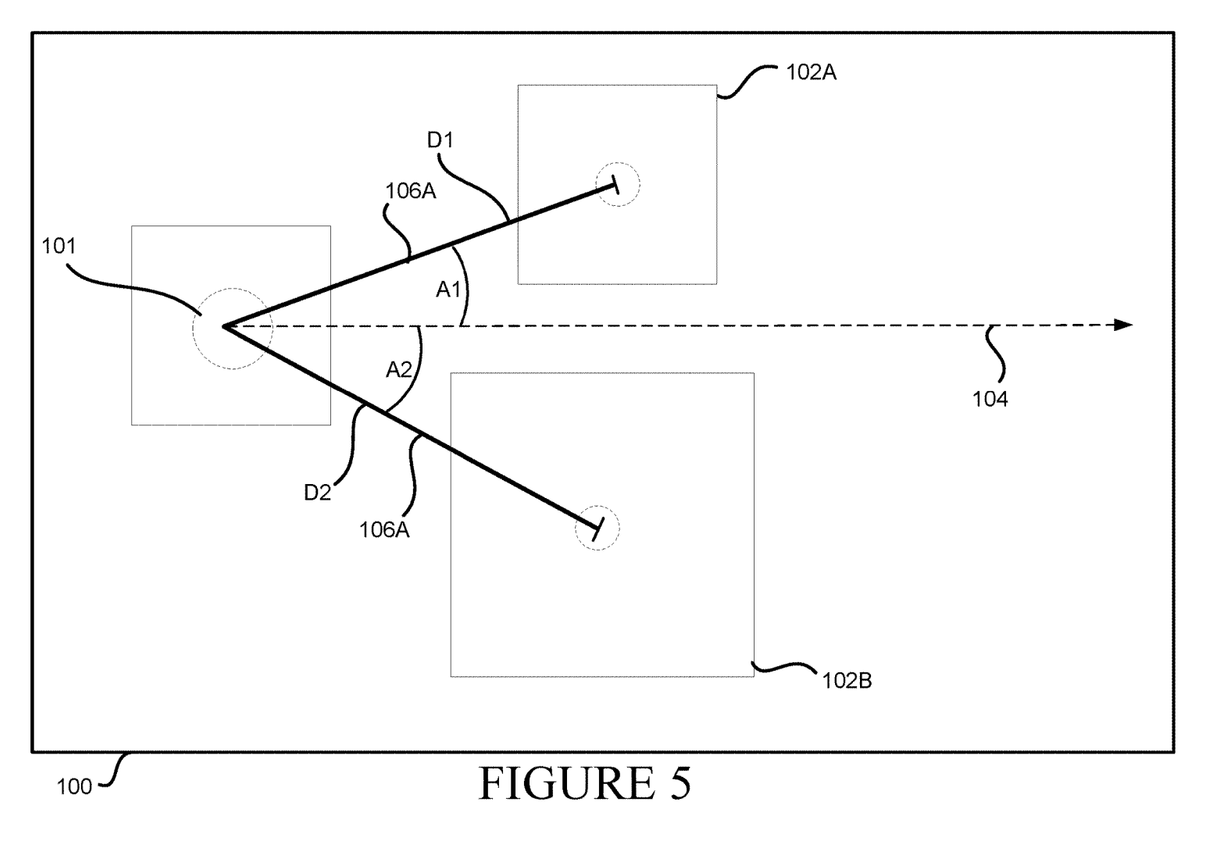
FIG. 5 illustrate a user interface having a number of selectable interface elements that can be used to define one or more angles and distances from a focus point, wherein the angles are based on a center point of an interface element.

In accordance with some aspects of the present disclosure, the measurements, e.g., the distance values and the angles, that are obtained can be based on any portion of an interface element 102. Thus, although the examples shown in FIGS. 2-3 illustrate angles and distances that are measured from a portion of an interface element 102 that is closest to the vector 104, the angles can be measured from other portions of each interface element. For instance, FIG. 5 provides one example where the angles (A1 and A2) and distance values (D1 and D2) are measured from a center point of each interface element 102. It can be appreciated that any technique for identifying a portion of the interface element 102 to measure an angle or distance can be used. Among other examples, a point at a center of mass for an icon can be utilized, a top edge of an icon or tile can be utilized, a left edge, a right edge, etc.

Figure 6A:
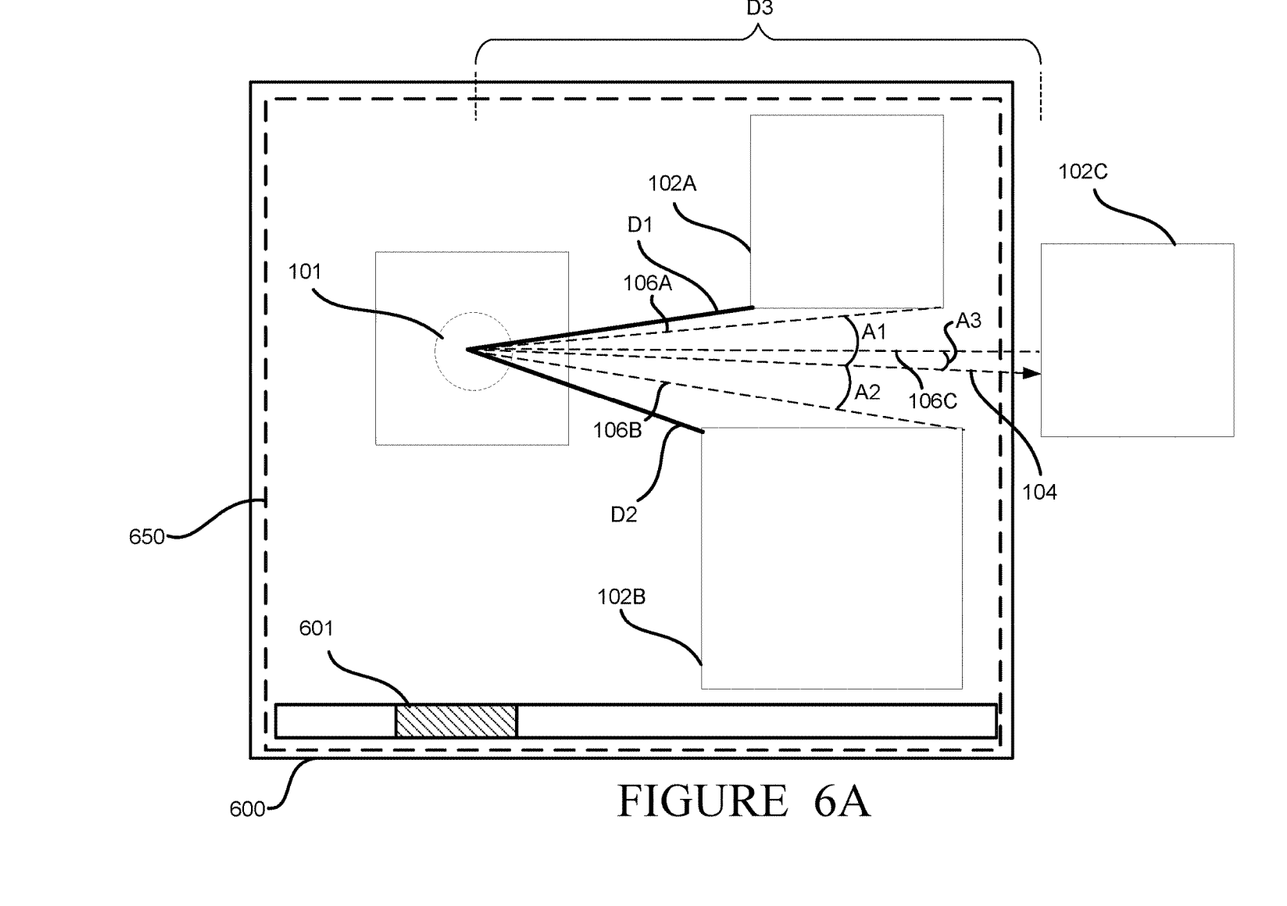
FIGS. 6A and 6B illustrate a user interface having a number of selectable interface elements relative to a viewing area.
Figure 6B:
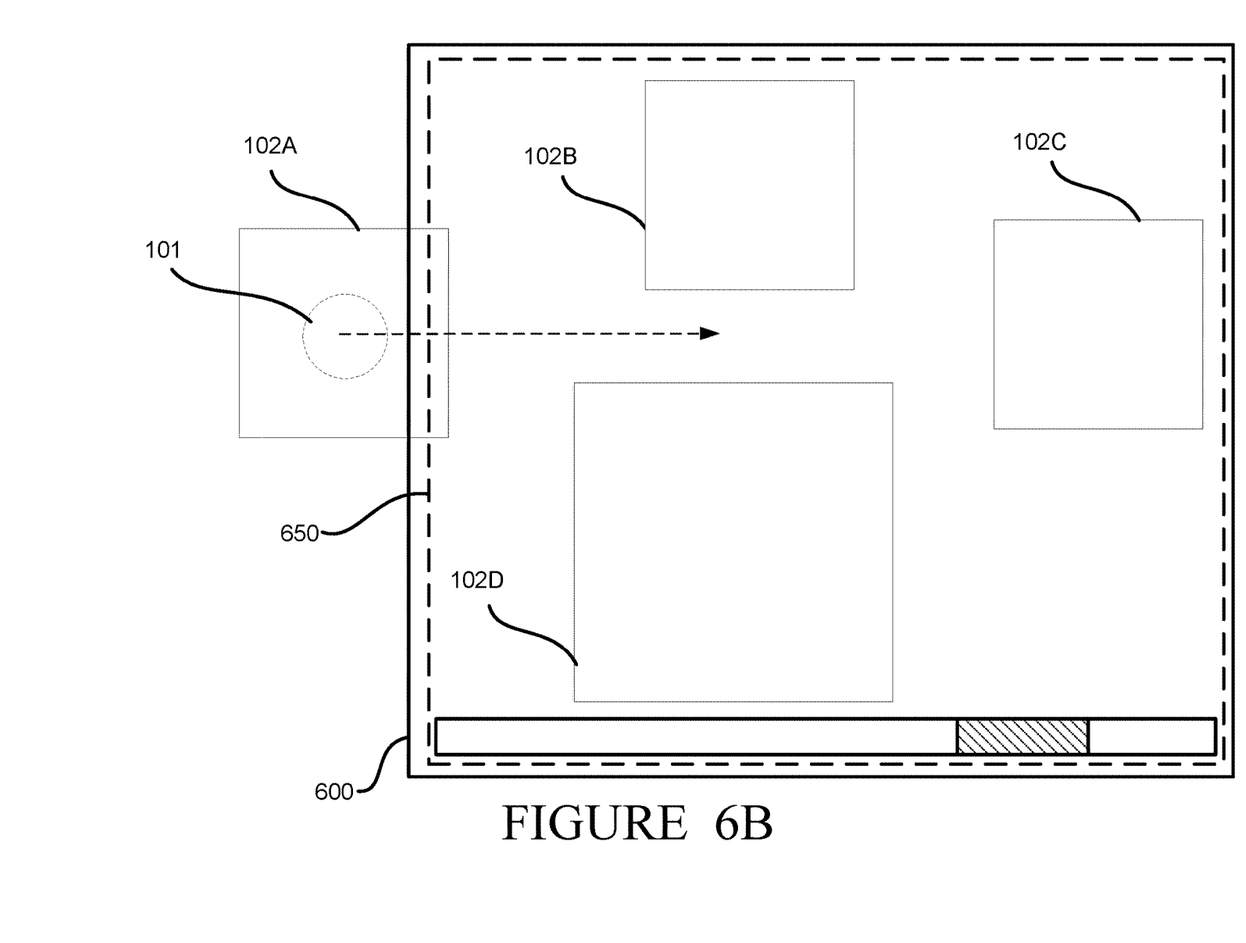

The techniques disclosed herein can also provide an auto-scrolling feature to move a viewable area (indicated by the box) of a user interface to show a selected interface element. FIG. 6A and FIG. 6B illustrate one illustrative example of an auto-scrolling feature based on techniques for enabling auto targeting assistance for input devices. In this example, it is a given that a user interface 600 includes a first interface element 102A, a second interface element 102B, a third interface element 102C, and a fourth interface element 102D. As shown, the third interface element 102C is outside of a viewing area 650 (also referred to herein as a "viewable area 650") of the user interface 600, and the other interface elements are within the viewing area 650. It can be appreciated that one or more scrolling parameters (as shown by the scrollbar 601) can be utilize to adjust the user interface 600 to bring the third interface element 102C within the viewing area 650. In some configurations, data defining a scrolling parameter can include a position within a scrolling range of a user interface 600, e.g., a predetermined value (10%, 50%, 90%, etc.) to the right from a left position or a predetermined value (10%, 50%, 90%, etc.) to the bottom from a top position.

In this example, a computer receives an input signal from an input device. The computer generates data defining a vector 104 originating from a focus point 101 of a user interface 600. The vector 104 is projecting in a direction indicated by the input signal. The computer can determine a first distance (D1) between the focus point 101 and a first user interface element 102A and an angle (A1) between the vector 104 and a first vector 106A between the focus point 101 and the first user interface element 102A. The computer can also determine a second distance (D2) between the focus point 101 and a second user interface element 102B and an angle (A2) between the vector 104 and a second vector 106B between the focus point 101 and the second user interface element 102B. The computer can also determine a third distance (D3) between the focus point 101 and a third user interface element 102C and an angle (A3) between the vector 104 and a third vector 106C between the focus point 101 and the third user interface element 102C.

The computer can then select one of the user interface elements based, at least in part, on the measured distances (D1, D2, and D3) and the angles (A1, A2, and A3). The selection of one interface can be based on weighted distances (D1, D2, and D3) and weighted angles (A1, A2, and A3). In this illustrative example, the third user interface element 102C is selected because D3 is less than D2 and D3, and because A3 is less than A1 and A2.

As shown in FIG. 6B, in response to selecting the third interface element 102C, configurations can cause the computer to automatically adjust one or more scrolling parameters of the user interface 600 to bring the selected interface element, e.g., the third interface element 102C, within the viewable area when the user interface element is selected. This examples provided for illustrative purposes and is not to be construed as limiting. It can be appreciated that scrolling parameters can be adjusted such that the viewing area 650 includes more than one selected interface element. For example, when a frustum is utilized, the adjustment to the scrolling parameters can move the viewable area to include the interface elements that are within the frustum by a threshold degree. For example, the scrolling parameters can be adjusted such that the user interface element is moved from outside the viewing area 650 (as shown in FIG. 6A) to a position such that the entire, or at least a part of, the user interface element (102C) is displayed in the viewing area 650 (as shown in FIG. 6B). In some configurations, the scrolling parameters can be adjusted to display the selected user interface element (102C) near an edge of the viewing area 650.

Any suitable technology can be utilized to determine if an interface element is within a viewing area 650, and any suitable technology can be utilized to determine a degree in which the scrolling parameters are adjusted. In one illustrative example, a coordinate system, e.g., using an (X, Y) format, can be utilized. For instance, the interface elements can be associated with one or more coordinates of a user interface. In addition, the borders of a viewing area 650 may be associated with one or more coordinates. In the example of FIG. 6A, consider a scenario where the lower left corner, the upper left corner, the upper right corner and the lower right corner of the viewing area 650 are respectively (0,0), (0,768), (1024, 768), and (1024,0).

For illustrative purposes, consider a scenario where the third interface element 102C is outside the viewing area 650 at position of (1580, 300), and the other interface elements (102A and 102B) are within the viewing area 650, e.g., respectively having coordinates (600, 500) and (575, 200). When the third interface element 102C is selected, the system can compare the coordinates to determine that the selected interface element is outside of the viewing area 650, and in response, the system can adjust one or more scrolling parameters to bring the selected interface element within the viewing area 650. In the example shown in FIG. 6B, the scrolling parameters can involve adjusting the coordinates of the viewing area 650 such that the position of the third interface element 102C (1580, 300) is within the borders of the viewing area 650. For example, adjustment to one or more scrolling parameters can cause the lower left corner, the upper left corner, the upper right corner and the lower right corner of the viewing area 650 to respectively be (1000,0), (1000,768), (2024, 768), and (2024,0). Thus, bringing the third interface element 102C (1580, 300) is within the borders of the viewing area 650.

In accordance with some aspects of the present disclosure, an input signal generated by an input device can indicate an intensity level. In some configurations, the vector 104 can be associated with the intensity level indicated by the input signal. The intensity level can come from a number of mechanical features of an input device, such as a pressure sensor, an analog joystick, or any other like device. In the case of a pressure sensor, which may be on a touchscreen, as the user applies the pressure to the sensor, an intensity level may raise which in turn can modify other data, such as a weighting factor. In some configurations, a weighting factor can be generated based on data quantifying, e.g., defining, an intensity level or magnitude of an input. The weighting factor can then be applied to an angle or a distance obtained during an analysis of a user interface element to generate a weighted angle and/or a weighted distance. The weighted angle and/or a weighted distance can then be utilized to select at least one interface element 102.

In some configurations, the intensity level indicated in the input signal can influence the length of the frustum 200. For instance, with reference to FIG. 2, the frustum 200 can have a longer vector 104 when the intensity indicated in the input data is increased. In addition, the frustum 200 can have a shorter vector 104 when the intensity indicated in the input data is decreased. Thus, by adjusting the length of the frustum 200, the techniques disclosed herein can include more or fewer graphical elements 102 in the analysis of the angles and/or distances. In an analog device, a length of a vector 104 can be based on how far the analog input is actuated. In a directional pad, the length of a vector 104 can be based on how long and/or a level of pressure the input is actuated.

Figure 7:
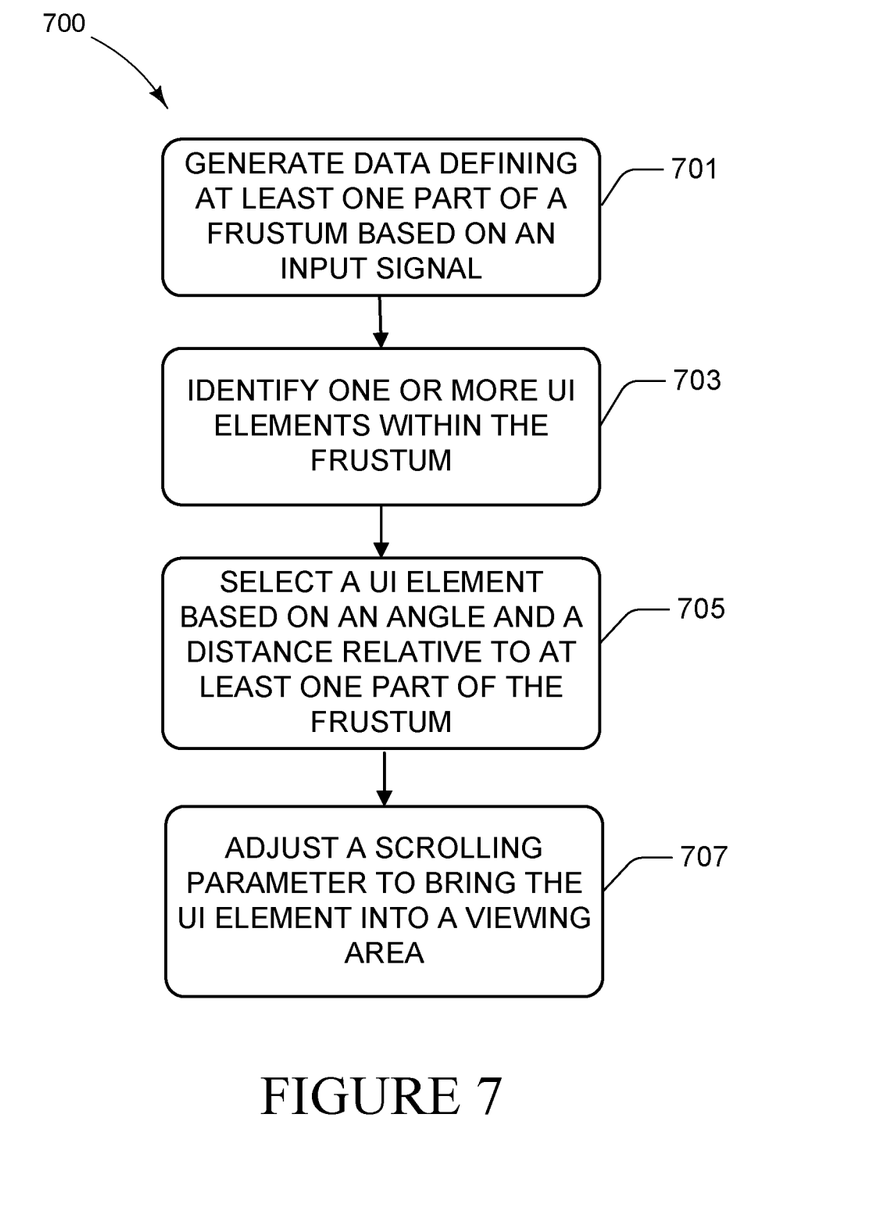
FIG. 7 illustrates a flow diagram of a routine for enabling auto targeting assistance for input devices.

Turning now to FIG. 7, aspects of a routine 700 for enabling auto targeting assistance for input devices are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 700 are described herein as being implemented, at least in part, by an application 829, component and/or circuit, or an operating system 827. In some configurations, the application 829 or another module running the features disclosed herein can be a dynamically linked library (DLL), a statically linked library, functionality produced by an application programming interface (API), a compiled program, an interpreted program, a script or any other executable set of instructions. Data, such as data indicating an input signal, and the application 829 can be stored in a data structure in one or more memory components. Data can be retrieved from the data structure by addressing links or references to the data structure.

Figure 8:
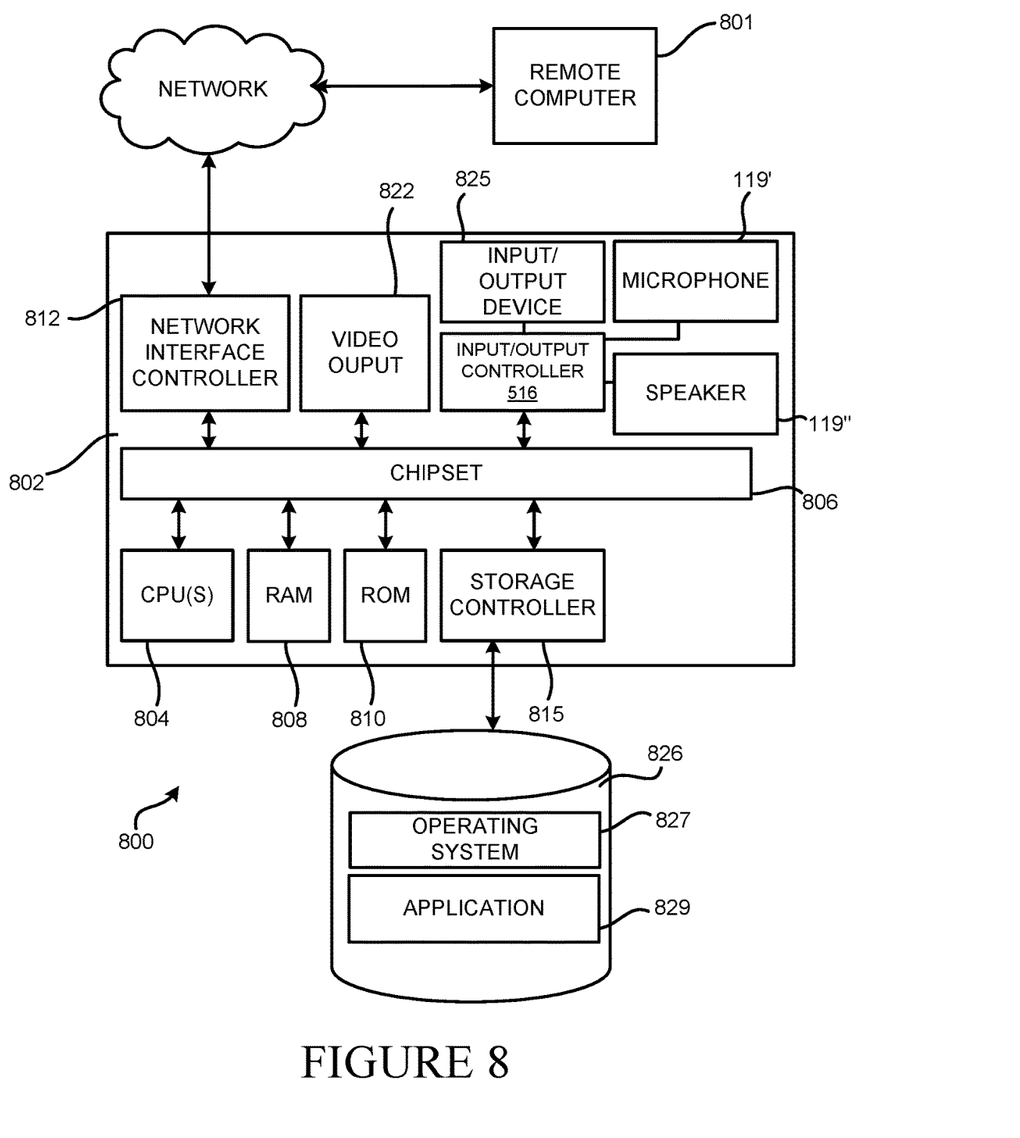
FIG. 8 is a computer architecture diagram illustrating an illustrative computer hardware and software architecture for a computing system capable of implementing aspects of the techniques and technologies presented herein.

Although the following illustration refers to the components of FIG. 8, it can be appreciated that the operations of the routine 700 may be also implemented in many other ways. For example, the routine 700 may be implemented, at least in part, by a processor of another remote computer or a local circuit. In addition, one or more of the operations of the routine 700 may alternatively or additionally be implemented, at least in part, by a chipset working alone or in conjunction with other software modules. Any service, circuit or application suitable for providing the techniques disclosed herein can be used in operations described herein.

With reference to FIG. 7, the routine 700 begins at operation 701, where one or more modules of a computing device generates data defining at least one component of a frustum 200. In some configurations, operation 701 may involve the generation of data defining a vector 104. In some configurations, operation 701 may involve the generation of data defining two sides of a frustum 200, each side is on opposite sides of the vector 104 at a predetermined angle from the vector. Aspect of the vector, such as the length and/or direction, can be based on an input signal of an input device.

Next, at operation 703, one or more modules of a computing device can identify interface elements that are within the frustum. In some configurations, one or more modules can determine that an interface element is within a frustum when at least a portion of the interface element is within the sides of the frustum. In some configurations, a threshold amount of an interface element needs to be within the sides of the frustum for the one or more modules to determine that the interface element is within the frustum. The threshold amount can include a percentage, for example, ranging from 1% to 100% of the interface element.

Next, at operation 705, one or more modules can select an interface element based on an angle and/or a distance relative to at least one component of a frustum. As summarized above, enable or a distance can be obtained by the one or more modules based on an analysis of the user interface. If an angle and/or a distance meets one or more thresholds, the interface element can be selected. The selection of an interface element can be based on a weighted angle and/or a weighted distance.

Next, at operation 707, the one or more modules can adjust a scrolling parameter to bring a selected interface element into a viewing area. Examples of such an operation are described above and shown in FIG. 6A and FIG. 6B. In either operation 705 or 707, one or more modules can also cause an execution of one or more functions associated with the selected interface element.

FIG. 8 shows additional details of an example computer architecture that can be utilized to implement aspects of the techniques disclosed herein. The computer architecture shown in FIG. 8 illustrates aspects of a system, such as a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 8 may be utilized to execute any of the software components described above. Although some of the components described herein are specific to the computing devices 800, it can be appreciated that such components, and other components may be part of any suitable remote computer 801, such as the authentication system 115.

The computing device 800 includes a baseboard 802, or "motherboard," which is a printed circuit board to which a multitude of components or devices may be connected by way of a system bus or other electrical communication paths. In one illustrative embodiment, one or more central processing units ("CPUs") 804 operate in conjunction with a chipset 806. The CPUs 804 may be standard programmable processors that perform arithmetic and logical operations necessary for the operation of the computing device 800.

The CPUs 804 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 may provide an interface to a RAM 808, used as the main memory in the computing device 800. The chipset 806 may further provide an interface to a computer-readable storage medium such as a read-only memory ("ROM") 810 or non-volatile RAM ("NVRAM") for storing basic routines that help to startup the computing device 800 and to transfer information between the various components and devices. The ROM 810 or NVRAM may also store other software components necessary for the operation of the computing device 800 in accordance with the embodiments described herein.

The computing device 800 may operate in a networked environment using logical connections to remote computing devices and computer systems through a network, such as the local area network. The chipset 806 may include functionality for providing network connectivity through a network interface controller (NIC) 812, such as a gigabit Ethernet adapter. The NIC 812 is capable of connecting the computing device 800 to other computing devices over the network. It should be appreciated that multiple NICs 812 may be present in the computing device 800, connecting the computer to other types of networks and remote computer systems. The network allows the computing device 800 to communicate with remote services and servers, such as the remote computer 801. As can be appreciated, the remote computer 801 may host a number of services such as the XBOX LIVE gaming service provided by MICROSOFT CORPORATION of Redmond Wash. In addition, as described above, the remote computer 801 may mirror and reflect data stored on the computing device 800 and host services that may provide data or processing for the techniques described herein.

The computing device 800 may be connected to a mass storage device 826 that provides non-volatile storage for the computing device. The mass storage device 826 may store system programs, application programs, other program modules, and data, which have been described in greater detail herein. The mass storage device 826 may be connected to the computing device 800 through a storage controller 815 connected to the chipset 806. The mass storage device 826 may consist of one or more physical storage units. The storage controller 815 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 826, other storage media and the storage controller 815 may include MultiMediaCard (MMC) components, eMMC components, Secure Digital (SD) components, PCI Express components, or the like.

The computing device 800 may store data on the mass storage device 826 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 826 is characterized as primary or secondary storage, and the like.

For example, the computing device 800 may store information to the mass storage device 826 by issuing instructions through the storage controller 815 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may further read information from the mass storage device 826 by detecting the physical states or characteristics of one or more particular locations within the physical storage units.

In addition to the mass storage device 826 described above, the computing device 800 may have access to other computer-readable media to store and retrieve information, such as program modules, data structures, or other data. Thus, although the companion application 132, the game application 131, other data and other modules are depicted as data and software stored in the mass storage device 826, it should be appreciated that these components and/or other modules may be stored, at least in part, in other computer-readable storage media of the computing device 800. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 800.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 800. For purposes of the claims, the phrase "computer storage medium," "computer-readable storage medium," and variations thereof, does not include waves or signals per se and/or communication media.

The mass storage device 826 may store an operating system 827 utilized to control the operation of the computing device 800. According to one embodiment, the operating system comprises a gaming operating system. According to another embodiment, the operating system comprises the WINDOWS® operating system from MICROSOFT Corporation. According to further embodiments, the operating system may comprise the UNIX, ANDROID, WINDOWS PHONE or iOS operating systems, available from their respective manufacturers. It should be appreciated that other operating systems may also be utilized. The mass storage device 826 may store other system or application programs and data utilized by the computing devices 800, such as the game application 131, companion application 132, game data 204, control commands 205, and/or any of the other software components and data described above. The mass storage device 826 might also store other programs and data not specifically identified herein.

In one embodiment, the mass storage device 826 or other computer-readable storage media is encoded with computer-executable instructions which, when loaded into the computing device 800, transform the computer from a general-purpose computing system into a special-purpose computer capable of implementing the embodiments described herein. These computer-executable instructions transform the computing device 800 by specifying how the CPUs 804 transition between states, as described above. According to one embodiment, the computing device 800 has access to computer-readable storage media storing computer-executable instructions which, when executed by the computing device 800, perform the various routines described above with regard to FIG. 7 and the other figures. The computing device 800 might also include computer-readable storage media for performing any of the other computer-implemented operations described herein.

The computing device 800 may also include one or more input/output controllers 816 for receiving and processing input from a number of input devices, such as a keyboard, a joystick, a mouse, a microphone, a headset, a touchpad, a touch screen, an electronic stylus, or any other type of input device. Also shown, the input/output controllers 816 is in communication with an input/output device 825. The input/output device 825 can include mice, keyboards, touch pads, analog joysticks, directional pads, cameras, wands, head-mounted displays (HMDs), pressure sensitive surfaces, and eye tracking devices, or any other device that interprets a gesture or activity of a user to generate an input signal indicating a direction and/or an intensity level. The input/output device 825 can also include a microphone and a module that can interpret a user's voice to generate an input signal indicating a direction. The input/output controller 816 may provide output to a display, such as a computer monitor, a flat-panel display, a digital projector, a printer, a plotter, or other type of output device. The input/output controller 816 may provide input communication with other devices such as a microphone 119', a speaker 119", game controllers and/or audio devices. In addition, or alternatively, a video output 822 may be in communication with the chipset 806 and operate independent of the input/output controllers 816. It will be appreciated that the computing device 800 may not include all of the components shown in FIG. 8, may include other components that are not explicitly shown in FIG. 8, or may utilize an architecture completely different than that shown in FIG. 8.

In closing, although the various embodiments have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method, comprising:
receiving an input signal from an input device;
generating data defining a vector originating from a focus point of a user interface, the vector projecting in a direction indicated by the input signal;
determining a distance between the focus point and a user interface element;
determining an angle between the vector and a second vector between the focus point and the user interface element;
selecting the user interface element based, at least in part, on the distance and the angle, wherein the user interface element is outside of a viewable area; and
adjusting one or more scrolling parameters to bring the user interface element within the viewable area.

2. The computer-implemented method of claim 1, wherein the user interface element is selected based on the angle meeting a first predetermined threshold and the distance meeting a second predetermined threshold.

3. The computer-implemented method of claim 1, further comprising:
determining a weighted angle based, at least in part, on a first weighting factor and the angle;
determining a weighted distance based, at least in part, on a second weighting factor and the distance, wherein the user interface element is selected based on the weighted angle meeting a first predetermined threshold and the weighted distance meeting a second predetermined threshold.

4. The computer-implemented method of claim 1, further comprising:
determining a priority based, at least in part, on one or more functions associated with the user interface element;
determining a weighted angle based, at least in part, on the priority and the angle;
determining a weighted distance based, at least in part, on the priority and the distance, wherein the user interface element is selected based on the weighted angle meeting a first predetermined threshold and the weighted distance meeting a second predetermined threshold.

5. The computer-implemented method of claim 1, further comprising:
generating data indicating a weighted angle based, at least in part, on one or more heuristic models;
determining a weighted distance based, at least in part, on the one or more heuristic models, wherein the user interface element is selected based on the weighted angle meeting a first predetermined threshold and the weighted distance meeting a second predetermined threshold.

6. The computer-implemented method of claim 1, wherein the vector is associated with a magnitude, wherein the magnitude is based, at least in part, on an intensity level indicated in the input signal, wherein the computer-implemented method further comprises:
determining a weighted angle based, at least in part, on the magnitude; and
determining a weighted distance based, at least in part, on the magnitude, wherein the user interface element is selected based on the weighted angle meeting a first predetermined threshold and the weighted distance meeting a second predetermined threshold.

7. The computer-implemented method of claim 6, wherein the vector is associated with a magnitude, wherein the magnitude is based, at least in part, on an intensity level indicated in the input signal, wherein the user interface element is selected based on the angle meeting a first predetermined threshold and the distance meeting a second predetermined threshold, wherein the second predetermined threshold is modified based on the magnitude.

8. A computer-implemented method, comprising:
receiving an input signal from an input device;
generating data defining a frustum comprising a vector projecting from a focus point of a user interface, wherein the vector projects in a direction indicated by the input signal, wherein the frustum comprises at least two sides, each side is on opposite sides of the vector at a predetermined angle from the vector;
determining when at least a portion of a first user interface element and when at least a portion of a second user interface element are within the sides of the frustum;
determining a first distance between the focus point and the first user interface element;
determining a first angle between the vector and a first vector between the focus point and the first user interface element;
determining a second distance between the focus point and the second user interface element;
determining a second angle between the vector and a second vector between the focus point and the second user interface element;
applying one or more weighting factors to at least one of the first angle, the second angle, the first distance, and the second distance to respectively generate at least one of a first weighted angle, a second weighted angle, a first weighted distance, and a second weighted distance; and
selecting the first user interface element or the second user interface element based, at least in part on, at least one of the first weighted angle, the second weighted angle, the first weighted distance, and the second weighted distance.

9. The computer-implemented method of claim 8, wherein the first user interface element is selected when the first weighted angle is less than the second weighted angle.

10. The computer-implemented method of claim 8, wherein the first user interface element is selected when the first weighted angle is less than the second angle.

11. The computer-implemented method of claim 8, wherein the first user interface element is selected when the first angle is less than the second weighted angle.

12. The computer-implemented method of claim 8, wherein the first user interface element is selected when the first weighted distance is less than the second weighted distance.

13. The computer-implemented method of claim 8, wherein the first user interface element is selected when the first weighted distance is less than the second distance.

14. The computer-implemented method of claim 8, wherein the first user interface element is selected when the first distance is less than the second weighted distance.

15. The computer-implemented method of claim 8, wherein the one or more weighting factors are based, at least in part, on a priority value of a function associated with the first user interface element.

16. The computer-implemented method of claim 8, wherein the one or more weighting factors are based, at least in part, on contextual data defining one or more preferences of a user, properties of an application, user activity of an application, and a level of accuracy required by an application.

17. A system, comprising:
one or more processing units; and
a computer-readable medium having encoded thereon computer-executable instructions to cause the one or more processing units to:
receive an input signal from an input device;
generate data defining a vector originating from a focus point of a user interface, the vector projecting in a direction indicated by the input signal;
determine a distance between the focus point and a user interface element;
determine an angle between the vector and a second vector between the focus point and the user interface element;
determine a weighted angle based, at least in part, on a first weighting factor and the angle;
determining a weighted distance based, at least in part, on the first weighting factor and the distance;
select the user interface element based, at least in part, on the weighted distance and the weighted angle; and
execute a computer-implemented function associated with the user interface element.

18. The system of claim 17, wherein the user interface element is selected when the first weighted angle is less than a second angle and when the weighted distance is less than a second distance, wherein the second angle is between the vector and a third vector between the focus point and a second user interface element, and wherein the second distance is between the focus point and the second user interface element.

19. The system of claim 17, wherein the user interface element is selected when the first weighted angle is less than a second angle, wherein the second angle is between the vector and a third vector between the focus point and a second user interface element.

20. The system of claim 17, wherein the user interface element is selected when the weighted distance is less than a second distance, wherein the second distance is between the focus point and a second user interface element.

* * * * *